(12) United States Patent
Bottome et al.

(10) Patent No.: US 9,289,950 B2
(45) Date of Patent: Mar. 22, 2016

(54) MANDREL FOR FORMING A COMPONENT

(75) Inventors: Kristofer J. Bottome, Nottingham (GB); Ian C. D. Care, Derby (GB)

(73) Assignee: ROLLS-ROYCE plc, London (GB)

( * ) Notice: Subject to any disclaimer, the term of this patent is extended or adjusted under 35 U.S.C. 154(b) by 678 days.

(21) Appl. No.: 13/590,757

(22) Filed: Aug. 21, 2012

(65) Prior Publication Data
US 2013/0074572 A1    Mar. 28, 2013

(30) Foreign Application Priority Data

Sep. 26, 2011    (GB) .................................. 1116476.1

(51) Int. Cl.
*B29C 33/44*    (2006.01)
*B29C 33/48*    (2006.01)
(Continued)

(52) U.S. Cl.
CPC ............... *B29C 70/32* (2013.01); *B29C 33/485* (2013.01); *B29C 53/824* (2013.01); *B29C 70/347* (2013.01)

(58) Field of Classification Search
CPC ............ B21D 9/01; B21D 9/12; B21D 31/04; B21D 39/08; B21D 39/20; B21D 39/203; B21D 41/026; B21D 41/028; B21K 21/10; B29C 33/44; B29C 33/48; B29C 33/485; B29C 70/32; B29C 33/308; B29C 43/10; B29C 43/3642; B29C 70/44; B29C 70/46; B29C 2043/3626; B29C 2043/3647; B29C 2043/3644; B32B 38/0012; B32B 2038/0028; Y10T 156/1041; Y10T 156/1043; Y10T 156/1028
USPC ......... 72/150, 370.06–370.08, 393, 398, 402, 72/403, 466.2
See application file for complete search history.

(56) References Cited

U.S. PATENT DOCUMENTS 2,381,395 A  *  8/1945  Brown ........................... 425/40
2,845,658 A       8/1958  Knibb
(Continued)

FOREIGN PATENT DOCUMENTS

CA    2 299 487 A1    8/2001
EP    0 206 268 A2   12/1986
(Continued)

OTHER PUBLICATIONS

Jan. 18, 2012 British Search Report issued in Patent Application No. GB1116476.1.
(Continued)

*Primary Examiner* — Shelley Self
*Assistant Examiner* — Peter Iannuzzi
(74) *Attorney, Agent, or Firm* — Oliff PLC

(57) ABSTRACT

A mandrel includes a support structure; main sectors carried by the support structure and each having a main forming surface; and intermediate sectors carried by the support structure and each having an intermediate forming surface. The main sectors and intermediate sectors are alternately arranged around the axis. The main sectors are moveable relative to the support structure between a radially inner main retracted position, and a radially outer main forming position. The intermediate sectors are moveable relative to the support structure between a radially inner intermediate retracted position, and a radially outer intermediate forming position. The mandrel further includes drive means for moving the main sectors and intermediate sectors from their respective retracted positions to their respective forming positions. The drive means is configured such that each main sector reaches its main forming position before the adjacent intermediate sectors reach their respective intermediate forming positions.

19 Claims, 6 Drawing Sheets

(51) Int. Cl.
  *B29C 70/32* (2006.01)
  *B29C 53/82* (2006.01)
  *B29C 70/34* (2006.01)

(56) References Cited

U.S. PATENT DOCUMENTS

| | | | |
|---|---|---|---|
| 4,412,802 A * | 11/1983 | Ohta | B29C 57/02 425/392 |
| 4,780,072 A * | 10/1988 | Burnette | B29C 33/485 118/205 |
| 8,220,154 B2 * | 7/2012 | Cacciaguerra | B29C 70/32 29/897.2 |
| 2004/0156936 A1 * | 8/2004 | McBride et al. | 425/35 |
| 2011/0132548 A1 * | 6/2011 | De Mattia | 156/577 |

FOREIGN PATENT DOCUMENTS

| | | | | |
|---|---|---|---|---|
| EP | 1 767 325 A2 | 3/2007 | | |
| IT | WO 2007148301 A2 * | 12/2007 | | B29C 33/485 |
| WO | WO 2007/148301 A2 | 12/2007 | | |
| WO | WO 2007148301 A2 * | 12/2007 | | |
| WO | WO 2010/092081 A1 | 8/2010 | | |

OTHER PUBLICATIONS

Dec. 5, 2012 Search Report issued in European Patent Application No. 12 18 1214.

* cited by examiner

MANDREL FOR FORMING A COMPONENT

The invention relates to a mandrel for forming components with a cavity. In particular, although not exclusively, the invention relates to a mandrel for forming components with a re-entrant cavity profile.

Shell components, such as a nose cone for a gas turbine engine, are often formed on an internal forming tool, such as a mandrel. Composite shell components may be formed by winding layers of reinforcement material onto a mandrel, which material is either pre-impregnated with resin or is impregnated with resin after winding, and curing the resin.

Internal forming tools for the manufacture of shell components require a small taper or draft angle to allow for demoulding, that is, to allow for the removal of the forming tool from the component in a withdrawal direction from the narrow end toward the wide end of the taper.

Internal re-entrant features cannot be produced using fixed-geometry internal forming tools because a component formed thereon will lock onto the tool. Internal re-entrant features of a shell component are those parts of the inner surface of the shell that protrude inwardly toward the internal forming tool in relation to other parts of the component in the withdrawal direction.

Accordingly, disposable cores are often used to manufacture shell components with re-entrant features, which are expensive, especially for large parts.

It is known to create external re-entrant features by layering the composite thicker in some parts than other parts of the shell in order to make up the required external profile, rather than use an internal forming tool with a re-entrant profile. However, this results in excess material, which may need to be machined away from a thin structure.

According to a first aspect of the invention there is provided a mandrel for forming a component with a cavity, the mandrel having a longitudinal axis and defining a cavity profile, the mandrel comprising: a support structure; a plurality of main sectors carried by the support structure and each having a main forming surface; and a plurality of intermediate sectors carried by the support structure and each having an intermediate forming surface; wherein the main sectors and intermediate sectors are alternately arranged around the axis, the main sectors being moveable relative to the support structure between a radially inner main retracted position, and a radially outer main forming position in which each main forming surface defines a part of the cavity profile, and in which the main sectors are spaced apart to define circumferential gaps; and the intermediate sectors being moveable relative to the support structure between a radially inner intermediate retracted position, and a radially outer intermediate forming position in which the intermediate sectors extend into the respective gaps, and in which each intermediate forming surface defines a part of the cavity profile; the mandrel further comprising drive means for moving the main sectors and intermediate sectors from their respective retracted positions to their respective forming positions; wherein the drive means comprises a plurality of drive units, each drive unit being arranged to move at least one of a main sectors and an adjacent intermediate sector from their retracted positions to their forming positions and is configured such that each main sector reaches its main forming position before the adjacent intermediate sectors reach their respective intermediate forming positions; wherein a lost motion connection is provided between each drive unit and the respective main sector.

The drive means may comprise a plurality of drive units, each drive unit being arranged to move at least one of the sectors.

Each drive unit may be configured to move a main sector and an adjacent intermediate sector from their retracted positions to their forming positions. Each drive unit may be configured to continue to move the adjacent intermediate sector to the intermediate forming position once the main sector has reached the main forming position, for example by the provision of a lost motion connection between the drive unit and the main sector. The lost motion connection may comprise a resilient means which biases the main sector away from the drive unit. Each drive unit may comprise a carrier block, the respective main sector being guided for displacement with respect to the guide block by means of a guide rod, and the resilient means comprising a spring which acts between the carrier block and the main sector.

Each of the intermediate sectors may have an outer radial portion which terminates at the intermediate forming surface and has two longitudinally extending edges, and two parallel side surfaces which extend substantially radially inward from the two longitudinal edges of the intermediate forming surfaces.

The main sectors may be shaped to provide recesses between adjacent main sectors and situated radially inwardly of the main forming surfaces, such that with the main sectors and the intermediate sectors in their respective retracted positions, at least a part of each intermediate sector is accommodated within a respective one of the recesses, such that parts of the intermediate sectors and main sectors are at the same radial position.

The cavity profile defined by the main forming surfaces and intermediate forming surfaces may be substantially axisymmetric about the axis.

Stop means may be provided for arresting each main sector and/or each intermediate sector at the respective main or intermediate forming position.

The mandrel may further comprise at least one fixed forming surface with a fixed position relative to the support structure, the fixed forming surface, the main forming surfaces and the intermediate forming surfaces providing a continuous forming surface when the main and intermediate sectors are in their forming positions.

At least a part of the cavity profile defined by the forming surfaces of the main sectors and intermediate sectors may be re-entrant with respect to the axis of the mandrel.

The main and intermediate sectors may comprise an annular array extending around the axis.

According to a second aspect of the invention there is provided a forming station comprising: a plurality of mandrels, each mandrel being in accordance with the first aspect of the invention; and winding means arranged to rotate the mandrels simultaneously around their respective axes, each mandrel extending outwardly from the winding means.

According to a third aspect of the invention there is provided a method of forming a component with a cavity using a mandrel in accordance with the first aspect of the invention, the method comprising: actuating the drive means to move the main sectors to their main forming positions and the intermediate sectors to their intermediate forming positions, each main sector reaching its main forming position before the adjacent intermediate sectors reach their respective intermediate forming positions; forming a component on the mandrel; actuating the drive means to move the main sectors to their main retracted positions and the intermediate sectors to their intermediate retracted positions; and removing the component from the mandrel.

The step of forming a component on the mandrel may further include the step of rotating the mandrel as a component is formed thereon.

Embodiments of the invention will now be described, by way of example, with reference to the accompanying drawings, in which:

FIG. 1 shows in schematic cross-sectional view a previously considered mandrel for forming a nose cone for a gas turbine engine, and a part of a nose cone formed thereon;

FIG. 2 schematically shows in half cross-section a mandrel in accordance with the present invention with a moveable sector in a forming position, and a part of a nose cone for a gas turbine engine formed on the mandrel;

Figure 2:
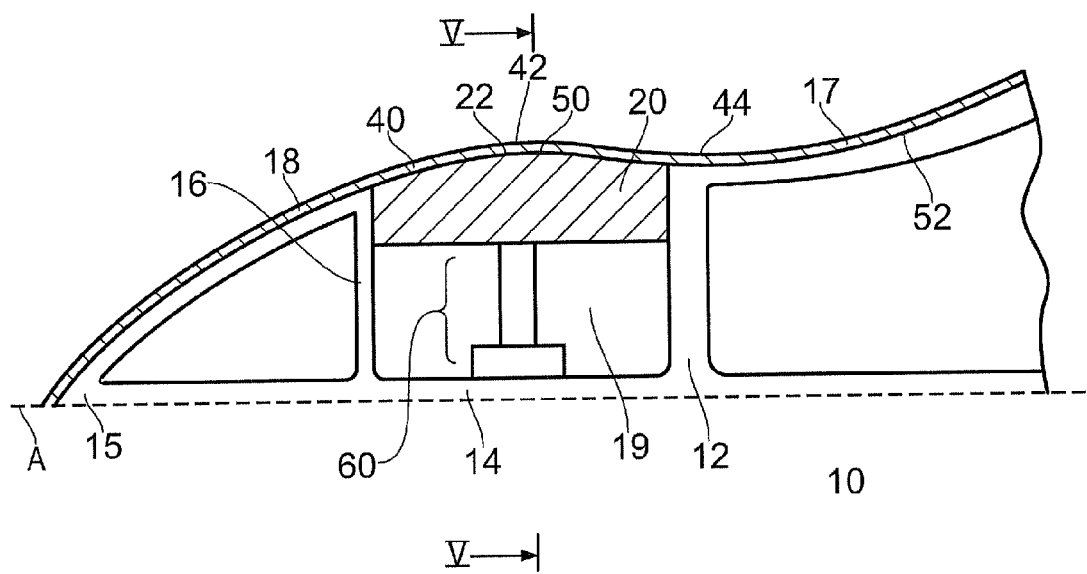
Figure 5:
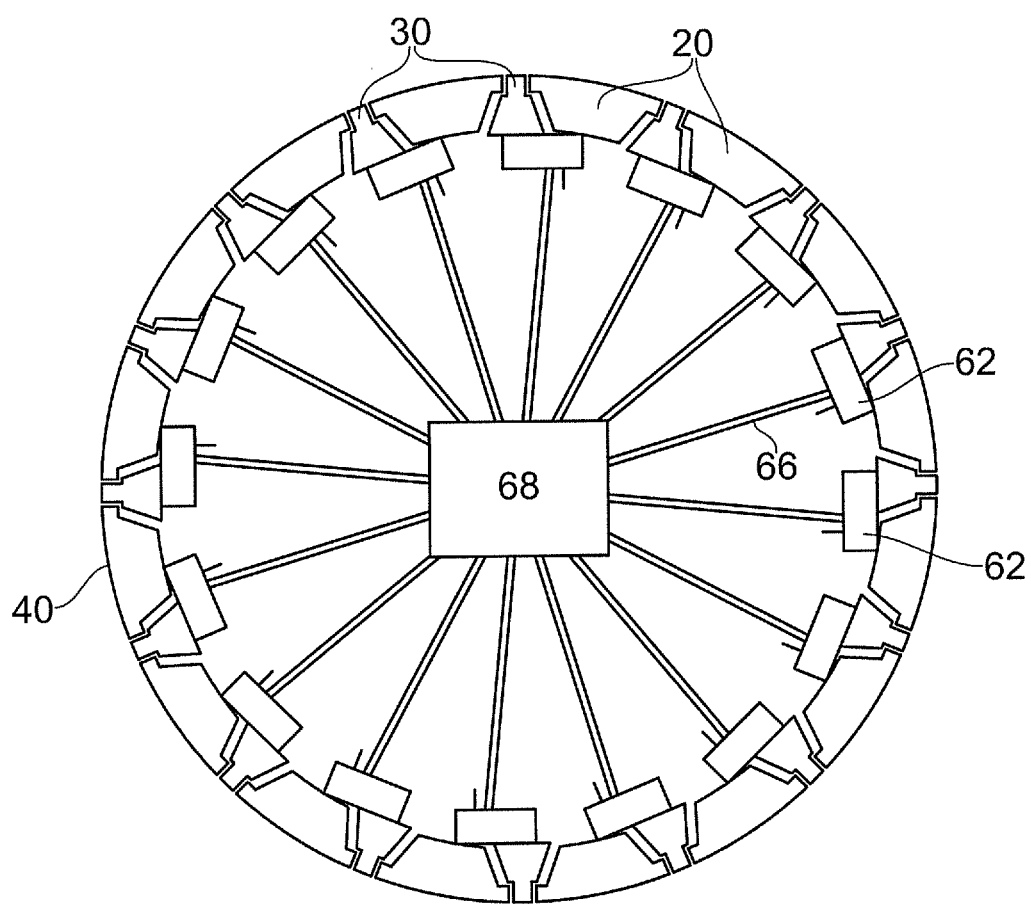
FIG. 5 shows the mandrel of FIGS. 2 to 4 in schematic cross-sectional view taken on the line V-V in FIG. 2.
Figure 7:
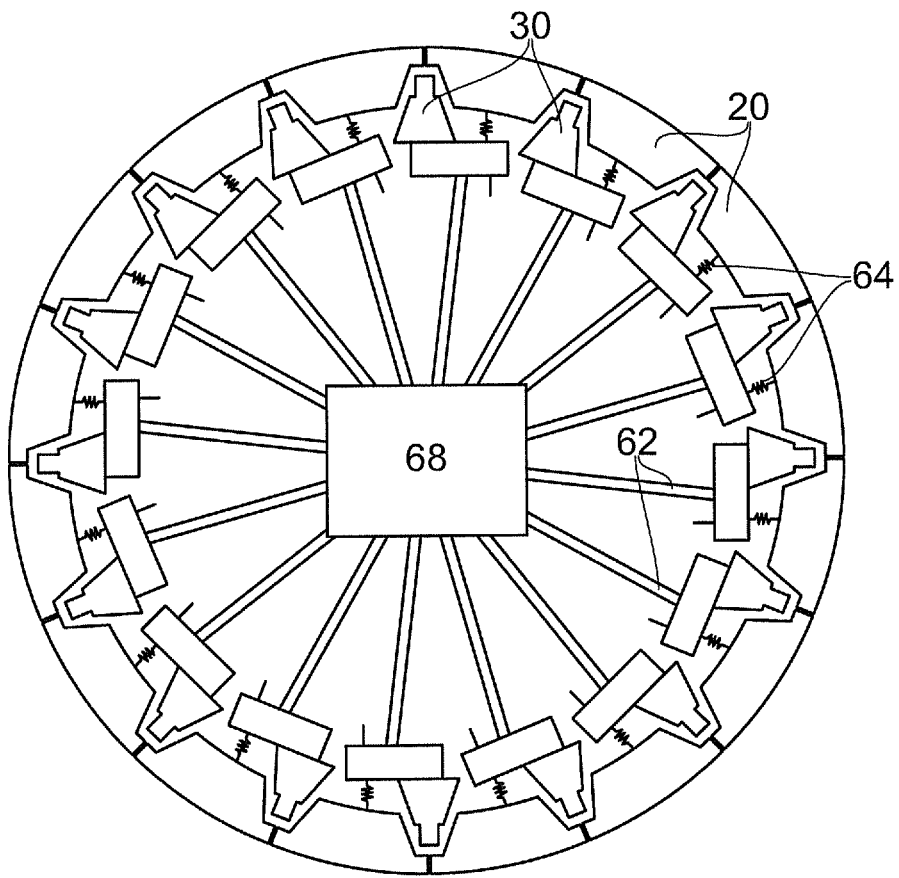
Figure 8:
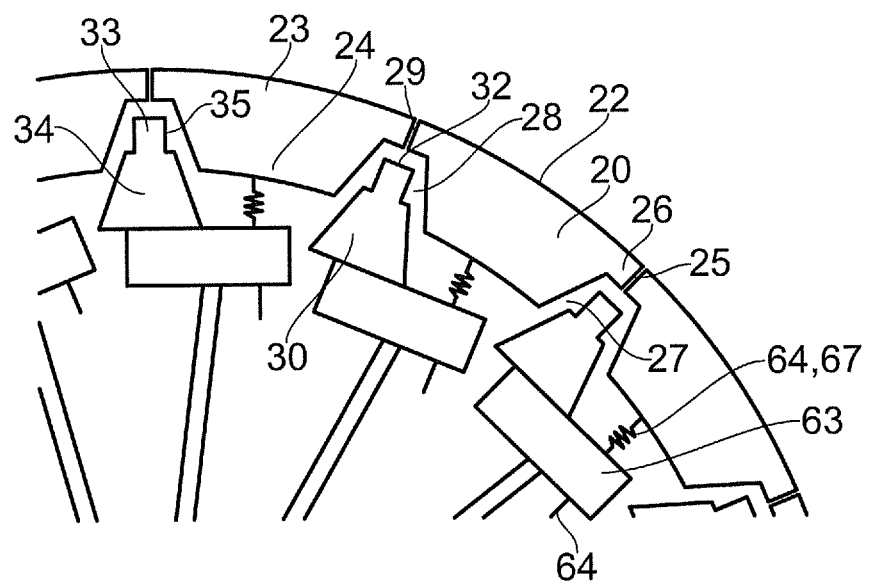
Figure 9:
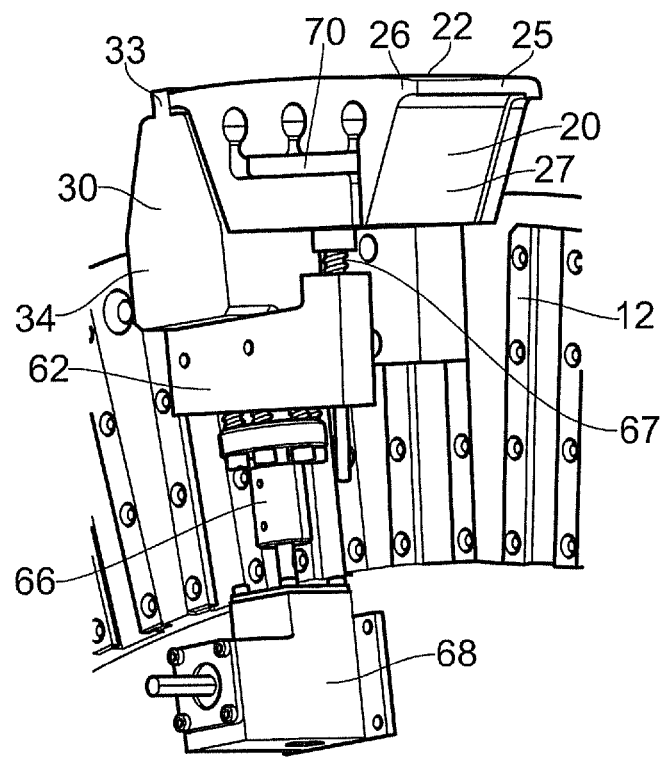
Figure 10:
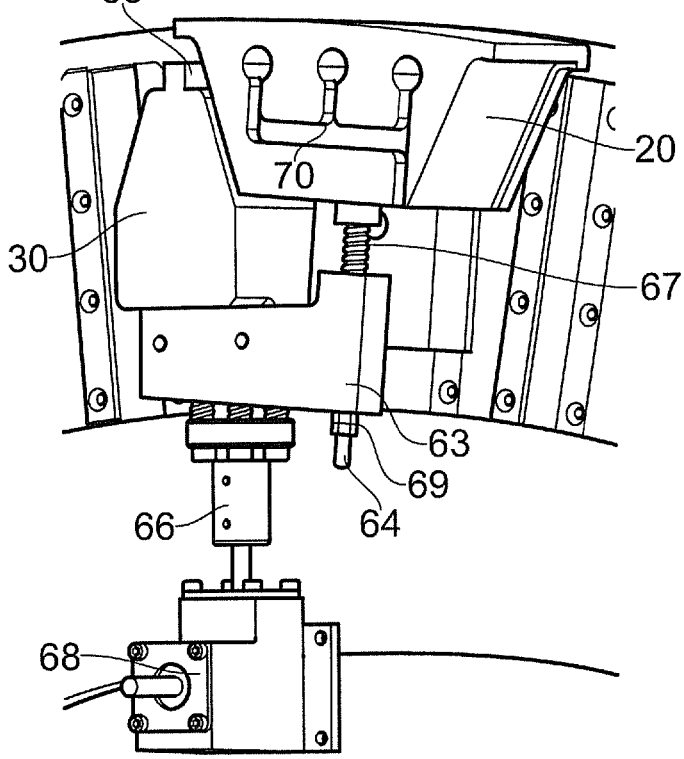
Figure 11:
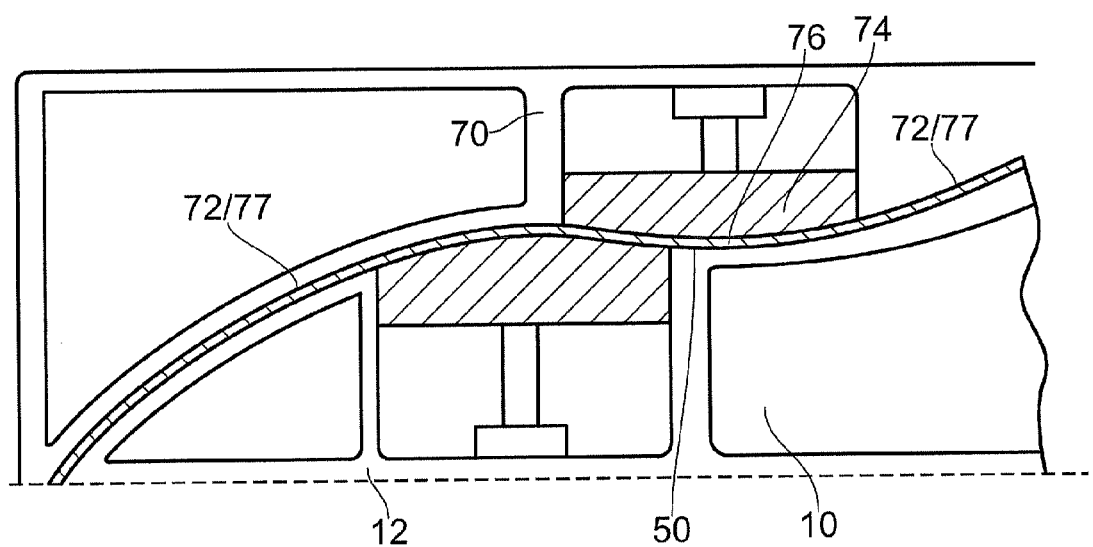

FIG. 7 corresponds to FIG. 5 but shows the movable sectors in the retracted position;

FIG. 8 shows part of the mandrel of FIG. 7 on an enlarged scale;

FIG. 9 shows in perspective view a main sector and intermediate sector pair in their respective forming positions;

FIG. 10 corresponds to FIG. 9 but shows the main and intermediate sector pair in their respective retracted positions; and FIG. 11 shows the mandrel of FIG. 2 with a component formed thereon, and an outer forming tool located around the component.

Figure 1:
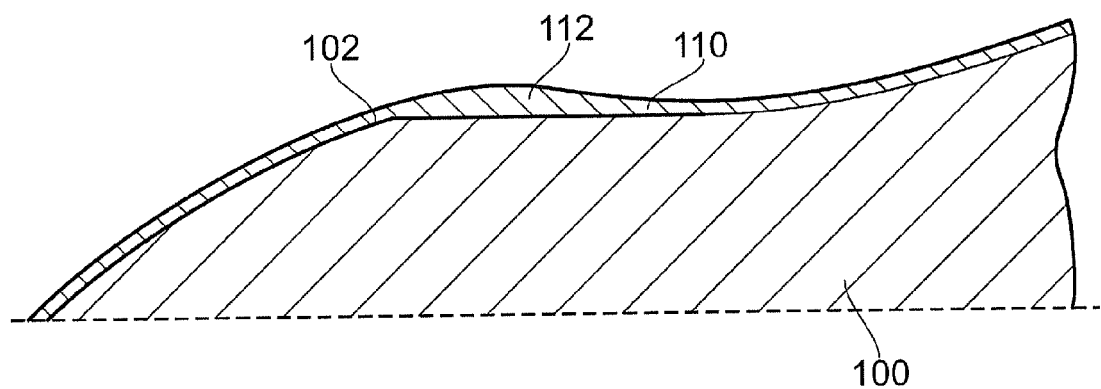

FIG. 1 shows generally at 100 a previously considered mandrel that does not fall within the scope of the present invention. The mandrel 100 is a single piece tool which presents an axisymmetric cavity profile 102 on which a component 110 can be formed. The cavity profile is tapered towards one end and is suitable for the manufacture of a nose cone for a gas turbine engine.

FIG. 1 also depicts the component 110, which has an internal surface corresponding to the cavity profile 102 of the mandrel 100. In this example, the component is a composite shell component comprising a fibre reinforcement, for example in the form of a tape, that has been wound onto the surface of the mandrel 100. The fibre reinforcement may be a pre-preg (i.e. is preimpregnated with resin), or resin may be introduced to the fibre reinforcement during or after winding, for example in a resin transfer moulding (RTM) process. Once the fibre reinforcement has been wound onto the mandrel 100 and the resin has been cured, the component 110 is removed from the mandrel 100 in the right-to-left direction with respect to FIG. 1, or otherwise the mandrel 100 is withdrawn from the component in the left-to-right direction.

The outer profile of the component has a bulge 112, thereby resulting in a re-entrant external profile. However, in order that the component and the mandrel can be separated, the internal profile of the component and the forming profile of the mandrel must widen continuously, or at least not narrow, in the withdrawing direction of the mandrel. Consequently, in order to achieve the re-entrant outer profile, the bulge 112 has to be formed by increasing the component thickness. This increases the quantity of material required, and also increases the weight of the component.

FIG. 2 shows generally at 10 a mandrel according to the invention comprising a support structure 12. The mandrel 10 further comprises moveable main sectors 20 and moveable intermediate sectors 30 (not shown in FIG. 2) part way along the length of the mandrel 10, which sectors are moveable between radially outer forming positions and radially inner retracted positions. In use, the mandrel 10 defines an axisymmetric cavity profile 40. A component 50 formed on the mandrel has a cavity with an inner surface 52 corresponding to the cavity profile 40.

As shown in FIG. 2, the support structure 12 comprises a central member 14 aligned with a central axis A of the mandrel. The support structure 12 of the mandrel 10 is connected to winding means for rotating it about the axis A.

The support structure 12 is cantilever mounted on the winding means at its proximal end, and terminates at a distal mandrel tip 15. Throughout this description, the terms proximal and distal are used to refer to parts of the mandrel closer to the proximal and distal ends of the mandrel respectively.

The support structure 12 further comprises a support frame 16 which carries a proximal fixed forming surface 17 at the proximal end of the mandrel, and a distal fixed forming surface 18 at the distal end of the mandrel. The fixed forming surfaces 17, 18 are outer radial surfaces of the mandrel, separated by a longitudinally extending gap 19 part way along the mandrel 10. In this embodiment, the fixed forming surfaces 17, 18 define all parts of the cavity profile 40 except over the longitudinal gap 19.

The fixed forming surfaces 17, 18 are axisymmetric about the axis A. Since the forming surfaces 17, 18 are axisymmetric, the radius of the forming surfaces 17, 18 at any point along the mandrel is the radial distance from the central axis A to the forming surface 17, 18 at that point.

Figure 3:
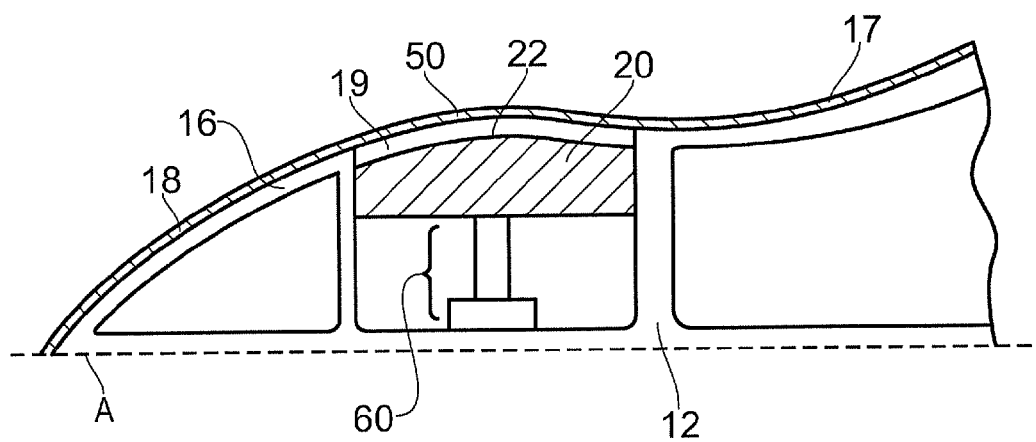
FIG. 3 shows the mandrel of FIG. 2 with the moveable sectors in a retracted position.
Figure 4:
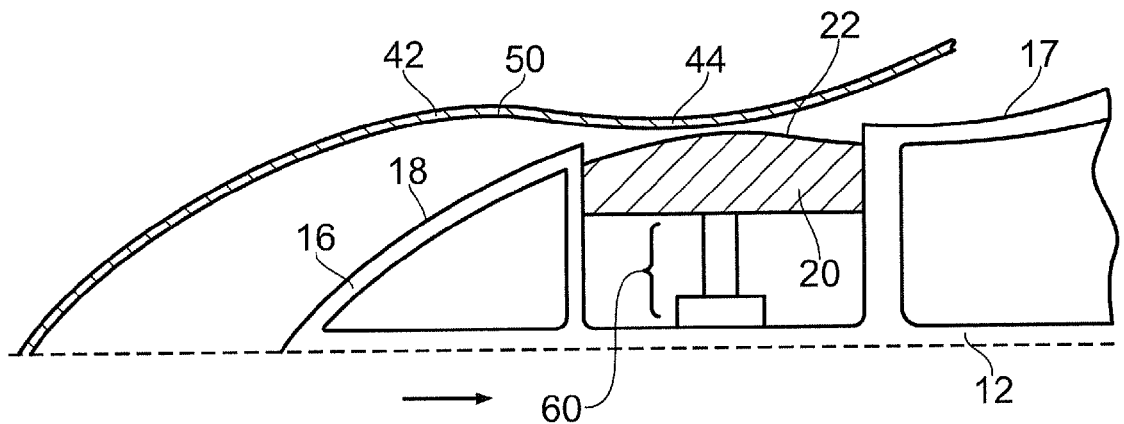
FIG. 4 shows the mandrel of FIG. 3 during removal of the nose cone.

As shown in FIGS. 2 to 4, the radius of the forming surfaces 17, 18 does not increase along the mandrel in the proximal-to-distal direction along the mandrel, but rather remains constant or decreases at all points along the mandrel. That is to say, the forming surfaces 17, 18 are non re-entrant.

The main sectors 20 and intermediate sectors 30 are disposed in the longitudinal gap 19 between the proximal and distal fixed forming surfaces 17, 18. The main sectors 20 and intermediate sectors 30 are alternately arranged around the axis A, and are mounted to the support structure 12 via drive means 60. As will be appreciated from FIG. 5, the main and intermediate sectors 20, 30 form an annular array extending all of the way around the axis A.

The main sectors 20 and intermediate sectors 30 have main forming surfaces 22 and intermediate forming surfaces 32 respectively. The main sectors 20 are moveable between a main forming position (FIG. 2) and a retracted forming position (FIG. 3). The intermediate sectors are moveable between an intermediate forming position and an intermediate retracted position.

The longitudinal profiles, i.e. the profiles as seen in FIGS. 2 and 3, of the main forming surfaces 22 and the intermediate forming surfaces 32 are the same.

In their respective forming positions, the forming surfaces 22, 32 of the main and intermediate sectors are flush with the adjacent fixed forming surfaces 17, 18, thereby defining the part of the cavity profile 40 in the gap 19 between the fixed forming surfaces 17, 18. In this embodiment, the cavity profile 40 is substantially continuous over the fixed forming surfaces 17, 18 and the main and intermediate forming surfaces 22, 32. The forming surfaces 22, 32 are axisymmetric about the axis A when the main and intermediate sectors 20, 30 are in their respective forming positions.

In this embodiment, the forming surfaces 22, 32 are configured to define a re-entrant cavity profile 40. That is to say, the radius of the cavity profile 40 increases at at least one point along the mandrel in the proximal to distal direction, such that there is at least one bulge 42 and at least one neck 44. A bulge is a wider part of the cavity profile at which the cavity profile radius at the proximal side is smaller than the radius of the bulge. Conversely, a neck is a narrower part of the cavity profile at which the cavity profile radius at the distal side is larger than the radius of the neck. As shown in FIG. 2, the profile of the main forming surface 22 results in a bulge 42 part way along the main sector 20, and results in a neck 44 where the main forming surface 22 and proximal fixed forming surface 17 meet.

Since the intermediate forming surface 32 has the same profile as the main forming surface 22, it also defines the bulge 42 and the neck 44.

The re-entrant cavity profile shown in FIG. 2 means that it would not be possible to withdraw the mandrel 10 from the component 50 formed thereon when the main and intermediate sectors are in their respective forming positions.

The main and intermediate sectors 20, 30 are moveable by the drive means 60 between their respective forming positions and retracted positions. In their respective retracted positions, the main and intermediate sectors 20, 30 are located radially inwardly of all proximal parts of the cavity profile 40 (FIG. 3), such that the mandrel 10 can be withdrawn from a component formed on the mandrel 10 (FIG. 4).

Figure 6:
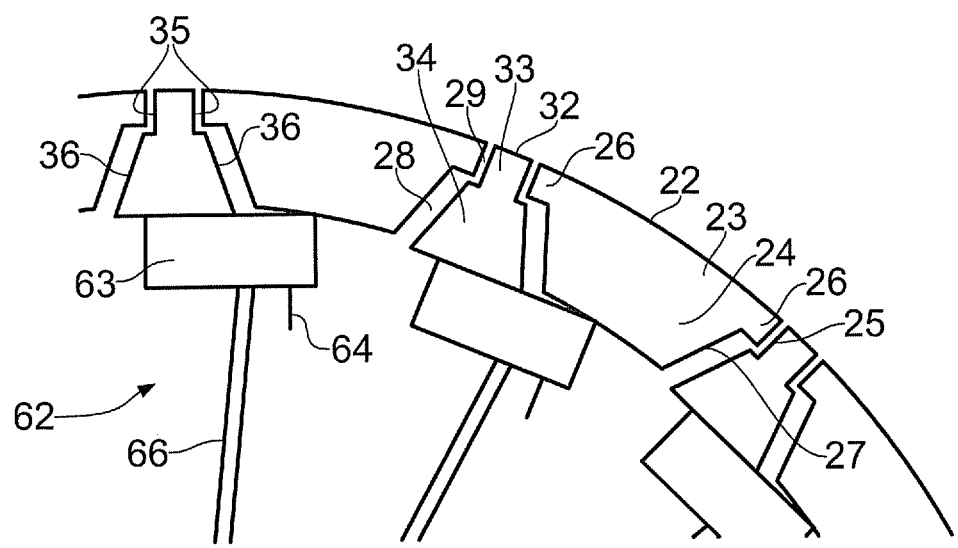
FIG. 6 shows part of the mandrel of FIG. 5 on an enlarged scale.

As shown in FIGS. 5 and 6, the main sectors 20 and the intermediate sectors 30 are alternately distributed around the axis A of the mandrel 10 in the main and intermediate forming positions respectively.

Each main sector 20 comprises a circumferentially extending radially outer portion 23 terminating at circumferential end surfaces 25. The outer portion 23 has longitudinally extending rails 26 which overhang a radially inner portion 24. Radially inwardly of the rails 26, side surfaces 27 of the inner portion 24 converge in the direction towards the radial centreline of the main sector 20 to define recesses 28 between each two adjacent main sectors 20.

With the main sectors 20 in the main forming position, there is a circumferentially extending gap 29 between the end surfaces 25 of adjacent main sectors 20, the gap 29 extending from the respective recess 28 to the exterior of the mandrel.

The intermediate sectors 30 are configured to fill this gap 29 when in the intermediate forming position, thereby forming a substantially continuous cavity profile 40 extending circumferentially across the alternating main and intermediate forming surfaces 22, 32.

Each intermediate sector 30 comprises a radially outer tip portion 33, and a radially inner wedge portion 34. The radially outer tip portion 33 has the intermediate forming surface 32 at its outer radial end, and substantially parallel longitudinally extending side surfaces 35. The inner wedge portion 34 has inclined side surfaces 36 that diverge in the radially inwards direction. Although shown spaced apart in FIGS. 5 to 8 for clarity, the side surfaces 36 of the intermediate sectors 30 contact, or are close to, the respective side surfaces 27 of the main sectors 20.

The radially outer tip portion 33 is configured to fit between the end surfaces 25 of the rails 26 of two adjacent main sectors 20. When the main and intermediate sectors 20, 30 are in their respective forming positions, the radially inner wedge portion 34 is configured to fit in the respective recess 28.

Each main sector 20 is mounted to a respective drive unit 62 of the drive means 60, along with an adjacent intermediate sector 30. Thus, each main sector 20 and the respective intermediate sector 30 comprise a pair which occupies a segment of the complete rotation of the axisymmetric cavity profile 40. For example, FIG. 5 shows sixteen main sectors 20 and sixteen intermediate sectors 30, and so in this embodiment a main sector and intermediate sector pair 20, 30 corresponds to a 22.5° segment of the cavity profile.

Each drive unit 62 comprises a carrier block 63 which is movable radially inwardly and outwardly along a drive path by a drive actuator 68 acting through a drive shaft 66. The carrier block 63 of each drive unit 62 lies radially inwardly of its main and intermediate sectors 20, 30. Each intermediate sector 30 is rigidly mounted to its respective carrier block 63, whereas each main sector 20 is mounted to the carrier block 63 by means of a resilient lost motion connection provided by a guide rod 64. The guide rod 64 is fixed to the main sector 20 and is guided within a passage in the carrier block 63. A spring 67 acts between the main sector 20 and the block 63 to bias the main sector 20 away from the block 63. A stop 69 formed by locking nuts on the rod 64 limits the displacement of the main sector 20.

FIGS. 7 and 8 show the main sectors 20 and intermediate sectors 30 in their respective retracted positions. The circumferentially extending gap 29 between the end surfaces 25 is greatly reduced and so there is no space between the main sectors 20 to accommodate the intermediate sectors 30. The intermediate sectors 30 are entirely located radially inwardly of the rails 26 of the main sectors 20, with the tip portion 33 and the outer part of the wedge portion 34 being accommodated in the recesses 28 of the main sectors 30.

In this configuration, the rod 64 is extended under the biasing force of the spring 67 to place the main sector 20 a predetermined distance from the block 63, as defined by the stop 69.

The drive unit 62 and the rod 64 are configured to allow the intermediate sectors 30 to retract radially inwardly farther than the main sectors 20, such that they may be accommodated at least partly in the recesses 28 of the main sectors. The rod 64 is mounted on the main sector 20 at an angle offset from the drive path, such that the angular spacing between the main sector 20 and the adjacent intermediate sector 30 changes according to the degree to which the spring 67 is compressed, and so the main and intermediate sectors 20, 30 can be manipulated into their forming positions by the single drive unit 62.

FIG. 9 shows the main sector 20 and the intermediate sector 30 in perspective view in their respective forming positions. The drive unit 62 is connected to an actuator 68, such as a motor or hydraulic actuator, via the drive shaft 66.

The main sector 20 is shown with longitudinally extending cut-outs 70, which serve both to save weight and dissipate heat to the surrounding air.

FIG. 9 shows a part of the support structure 12. A stop (not shown) is provided to limit the movement of the main sector 20 so as to prevent it from extending beyond the main forming position. It will be appreciated that the stop can optionally be placed on either the main sector 20 or the support structure 12 to cause abutment between the main sector 20 and support structure 12 when the main sector 20 reaches the main forming position.

Similarly, a stop (not shown) may be provided to limit the movement of the intermediate sector 30 so as to prevent it from extending beyond the intermediate forming position. The stop may cause limiting abutment between the support structure 12 and the intermediate sector 30, or otherwise between the drive unit 12 and the main sector 20 or the support structure 12, or otherwise between the intermediate sector 30 and the main sector 20. It will be appreciated that other embodiments of the invention may use alternative stopping means.

FIG. 10 shows the main and intermediate sector pair 20, 30 of FIG. 9 in their respective retracted positions. The rod 64 is extended, and so the block 63 and the main sector 20 are separated by the predetermined distance.

In use, the drive actuator 68 moves the drive units 62 radially inwardly and outwardly along the drive path to move the main sectors 20 and intermediate sectors 30 between their respective retracted and forming positions.

To form a component on the mandrel 10, the main and intermediate sectors 20, 30 are moved to their forming positions as shown in FIGS. 2, 5, 6 and 9. The mandrel is rotated about its axis A and a fibre reinforcement in the form of a yarn, tow or tape is drawn from a spool and wound about the mandrel. The fibre reinforcement may be pre-impregnated, or alternatively may be impregnated with resin during travel from the spool to the mandrel, or after winding.

Following winding and impregnation with resin if required, the resin is caused or allowed to cure. During curing, an external mould (not shown in FIG. 2) may be placed around the winding to define the external profile of the component and/or to control wall thickness.

As shown in FIG. 2, the forming surfaces 22, 32 of the main and intermediate sectors 20, 30 terminate at each end flush with the adjacent fixed forming surfaces 17, 18, to form the internal surface with a continuous, i.e. smoothly curved, profile. As discussed above, the profile of the mandrel results in the internal surface 52 having a re-entrant profile which prevents withdrawal of the mandrel in the configuration shown in FIG. 2. Consequently, in order to separate the mandrel 10 and the component 50, the drive means 60 is actuated to move each block 63 along its drive path in a radially inward direction to retract the main and intermediate sectors 20, 30 from their respective forming positions to their respective retracted positions.

At first, only the intermediate sector 30 moves radially inwardly, and the spring 67 continues to hold the main sector 20 in its main forming position. As the intermediate sector 30 and the block 63 move inwardly, the cooperation between the rod 64 and the block 63 causes relative angular displacement between the adjacent stationary main sector 20 and the intermediate sector 30. For this purpose, the rod 64 is angularly offset from the drive path. Thus, as the intermediate sector 30 moves inwardly, the main sector 20 is displaced circumferentially towards the intermediate sector 30, while initially remaining at the same radial position. Thus, the adjacent rail 26 of the main sector 20 moves over the radially outer tip portion 33 of the intermediate sector 30.

Eventually, the stop 69 contacts the block 63 to prevent further separating movement between the block 63 and the main sector 20. Once the rod 64 is fully extended, both the main and intermediate sectors 20, 30 move radially inwardly together.

The drive unit 62 ceases to move the main and intermediate sectors 20, 30 once they are in their respective retracted positions. In their respective retracted positions, all parts of the main and intermediate sectors 20, 30 are positioned radially inwardly of the proximal parts of the cavity profile 40, and the rails 26 of adjacent main sectors 20 abut one another, with the intervening intermediate sectors 30 situated beneath them, in the respective recesses 28. FIGS. 3, 7, 8 and 10 show the main and intermediate sectors 20, 30 in their respective retracted positions.

The mandrel 10 and component 50 are separated either by withdrawing the mandrel 10 from the component or by removing the component 50 from the mandrel 10 along the direction of the central axis A.

To return the mandrel 10 to the forming condition, the drive actuator 68 is activated to cause each block 63 to move radially outwardly along its drive path, and so the main and intermediate sectors 20, 30 also move radially outwardly in the same direction and at the same rate. When each main sector 20 reaches its main forming position, it is arrested by the stop (not shown). The drive means 60 continues to move the block 63 along the drive path, compressing the spring 67, this movement being permitted by the lost motion connection provided by the guide rod 64. As the intermediate sector 30 moves towards its intermediate forming position, its wedge portion 34 engages the side surfaces 27 of adjacent main sectors 20 to assist the rod 64 in guiding the main sectors 20 to the appropriate angular positions and thereby permits the radially outer tip portion 33 of each intermediate sector 30 to move between the rails 26 of the adjacent main sectors 20.

As the intermediate sector 30 reaches the intermediate forming position, either the drive unit 62 or the intermediate sector 30 comes into abutment with a stop mounted on the support structure, or a portion of the main sector 20, to arrest the intermediate sector 30 at its intermediate forming position.

As shown in FIG. 11, the apparatus may further comprise an outer forming tool 70 which is disposed around the outside of the component 50 being formed on the mandrel 10. The outer forming tool 70 has fixed curing surfaces 72 and moveable sectors 74 that move between a radially outer retracted position and a radially inner curing position.

The moveable sectors 74 operate in a similar way to the main sectors 20 of the mandrel 10. The outer forming tool 70 is arranged to be placed over the component 50 on the mandrel 10 with the moveable sectors 74 in the retracted position. Once in place over the component 50, the sectors 74 move radially inwardly to the curing position, in which curing surfaces 76 of the sectors 74 conform with the desired shape of the external re-entrant profile.

In the radially outer retracted position, the moveable sectors have circumferentially extending gaps between them. As they move into the radially inner curing position, the circumferentially extending gaps reduce until the curing surfaces 76 meet each other in the curing position to form a substantially continuous curing profile 77 over the fixed curing surfaces 72 and the curing surfaces 76 of the moveable sectors 74. The outer forming tool 70 is a single tool, and therefore allows a simpler and more compact manufacturing process than previously considered multi-part tools.

The mandrel 10 of the invention provides a simple, compact and relatively inexpensive means for forming a re-entrant internal cavity profile of a component. A component 50 may be directly formed on the mandrel 10, and subsequently separated from the mandrel 10 by simple axial movement.

Multiple mandrels 10 according to the invention may be provided on a single winding machine. The winding machine may have 2, 3, 4 or more mandrels mounted in a cantilever manner on the machine for rotation about different axes. The winding machine may have a single motor for winding each of the mandrels 10 simultaneously. Alternatively, each of the mandrels may be rotated by independent motors. The winding machine can thus produce several components simultaneously under identical conditions.

The winding machine may further comprise manipulators, robots or gantries to dispense the composite material onto the mandrels.

The winding machine with multiple mandrels significantly reduces the factory footprint per part since it is more compact than previously considered winding machines. Furthermore, one of the components may be subjected to destructive testing, with a high level of confidence that the other, non-tested, components produced during the same operation will have the same failure characteristics as the tested component.

The invention claimed is:

1. A mandrel for forming a component with a cavity, the mandrel having a longitudinal axis and defining a cavity profile, the mandrel comprising:
   a support structure;
   a plurality of main sectors carried by the support structure and each having a main forming surface;
   a plurality of intermediate sectors carried by the support structure and each having an intermediate forming surface; and
   a drive device,
   wherein:
   the main sectors and intermediate sectors are alternately arranged around the axis, the main sectors being moveable relative to the support structure between a radially inner main retracted position and a radially outer main forming position in which each main forming surface defines a part of the cavity profile, and in which the main sectors are spaced apart to define circumferential gaps;
   the intermediate sectors being moveable relative to the support structure between a radially inner intermediate retracted position and a radially outer intermediate forming position in which the intermediate sectors extend into the respective gaps, and in which each intermediate forming surface defines a further part of the cavity profile;
   the drive device is configured to move the main sectors and intermediate sectors from their respective retracted positions to their respective forming positions;
   the drive device comprises a plurality of drive units, each drive unit including a carrier block on which a main sector and an adjacent intermediate sector are mounted, each carrier block being arranged to move the mounted main sector and the mounted adjacent intermediate sector from their respective retracted positions to their respective forming positions and being configured such that each main sector reaches its main forming position before any of the adjacent intermediate sectors reaches its intermediate forming position; and
   a lost motion connection is provided between each drive unit and the respective main sector.

2. The mandrel according to claim 1, wherein each carrier block configured to continue to move the mounted adjacent intermediate sector to its intermediate forming position once the mounted main sector reaches its main forming position.

3. The mandrel according to claim 2, wherein the lost motion connection comprises a resilient component which biases the mounted main sector away from the drive unit.

4. The mandrel according to claim 3, wherein each carrier block guides the mounted main sector by means of a guide rod, and the resilient component comprises a spring which acts between the carrier block and the mounted main sector.

5. The mandrel according to claim 1, wherein each of the intermediate sectors has an outer radial portion bounded by the intermediate forming surface, and two substantially parallel side surfaces extending radially inward from two longitudinal edges of the intermediate forming surfaces.

6. The mandrel according to claim 1, wherein adjacent ones of the main sectors are shaped to provide a respective recess situated radially inwardly of the main forming surfaces, for accommodating at least a part of each intermediate sector when the main and intermediate sectors are in their respective retracted positions.

7. The mandrel according to claim 1, wherein the cavity profile defined by the main forming surfaces and the intermediate forming surfaces is substantially axisymmetric about the axis.

8. The mandrel according to claim 1, further comprising at least one stop arranged to prevent each main sector from extending beyond its main forming position.

9. The mandrel according to claim 1, further comprising at least one stop arranged to prevent each intermediate sector from extending beyond its intermediate forming position.

10. The mandrel according to claim 1, the mandrel further comprising at least one fixed forming surface with a fixed position relative to the support structure, the fixed forming surface, the main forming surfaces, and the intermediate forming surfaces providing a continuous forming surface when the main and intermediate sectors are in their respective forming positions.

11. The mandrel according to claim 1, wherein at least a part of the cavity profile defined by the forming surfaces of the main sectors and intermediate sectors is a re-entrant with respect to the axis of the mandrel.

12. The mandrel according to claim 1, wherein the main sectors and intermediate sectors comprise an annular array extending around the axis.

13. A forming station comprising:
   at least one mandrel having a longitudinal axis and defining a cavity profile, the mandrel comprising:
   a support structure;
   a plurality of main sectors carried by the support structure and each having a main forming surface;
   a plurality of intermediate sectors carried by the support structure and each having an intermediate forming surface; and
   a drive device,
   wherein:
   the main sectors and intermediate sectors are alternately arranged around the axis, the main sectors being moveable relative to the support structure between a radially inner main retracted position and a radially outer main forming position in which each main forming surface defines a part of the cavity profile, and in which the main sectors are spaced apart to define circumferential gaps;
   the intermediate sectors being moveable relative to the support structure between a radially inner intermediate retracted position and a radially outer intermediate forming position in which the intermediate sectors extend into the respective gaps, and in which each intermediate forming surface defines a further part of the cavity profile;
   the drive device is configured to move the main sectors and intermediate sectors from their respective retracted positions to their respective forming positions;
   the drive device comprises a plurality of drive units, each drive unit including a carrier block on which a main sector and an adjacent intermediate sector are mounted, each carrier block being arranged to move the mounted main sector and the mounted adjacent intermediate sector from their respective retracted positions to their respective forming positions and being configured such that each main sector reaches its main forming position before any of the adjacent intermediate sectors reaches its intermediate forming position;
   a lost motion connection is provided between each drive unit and the respective main sector; and
   a winding device is arranged to rotate the mandrels simultaneously around their respective axes, each mandrel extending outwardly from the winding device.

14. A method of forming a component with a cavity using a mandrel having a longitudinal axis and defining a cavity profile, the mandrel comprising:
- a support structure;
- a plurality of main sectors carried by the support structure and each having a main forming surface;
- a plurality of intermediate sectors carried by the support structure and each having an intermediate forming surface; and
- a drive device, wherein:
- the main sectors and intermediate sectors are alternately arranged around the axis, the main sectors being moveable relative to the support structure between a radially inner main retracted position and a radially outer main forming position in which each main forming surface defines a part of the cavity profile, and in which the main sectors are spaced apart to define circumferential gaps;
- the intermediate sectors being moveable relative to the support structure between a radially inner intermediate retracted position and a radially outer intermediate forming position in which the intermediate sectors extend into the respective gaps, and in which each intermediate forming surface defines a further part of the cavity profile;
- the drive device is configured to move the main sectors and intermediate sectors from their respective retracted positions to their respective forming positions;
- the drive device comprises a plurality of drive units, each drive unit including a carrier block on which a main sector and an adjacent intermediate sector are mounted, each carrier block being arranged to move the mounted main sector and the mounted adjacent intermediate sector from their respective retracted positions to their respective forming positions and being configured such that each main sector reaches its main forming position before any of the adjacent intermediate sectors reaches its intermediate forming position; and
- a lost motion connection is provided between each drive unit and the respective main sector, the method comprising:

actuating the drive device to move the main sectors and the intermediate sectors to their respective forming positions, each main sector reaching its main forming position before any of the adjacent intermediate sectors reaches its intermediate forming position;

forming a component on the mandrel;

actuating the drive device to move the main sectors and the intermediate sectors to their respective retracted positions; and removing the component from the mandrel.

15. The method of forming a component according to claim 14, wherein the step of forming a component on the mandrel further includes a step of rotating the mandrel as the component is formed thereon.

16. The mandrel according to claim 10, wherein the fixed forming surface, the main forming surfaces, and the intermediate forming surfaces abut one another when the main sectors and intermediate sectors are in their respective forming positions to provide the continuous forming surface.

17. The mandrel according to claim 1, wherein when the main sectors are in the radially outer main forming position and the intermediate sectors are in the radially outer intermediate forming position, the gap extends to the main forming surface of the main sectors and to the intermediate forming surface of the intermediate sectors.

18. The forming station according to claim 13, wherein when the main sectors are in the radially outer main forming position and the intermediate sectors are in the radially outer intermediate forming position, the gap extends to the main forming surface of the main sectors and to the intermediate forming surface of the intermediate sectors.

19. The method of forming a component according to claim 14, wherein when the main sectors are in the radially outer main forming position and the intermediate sectors are in the radially outer intermediate forming position, the gap extends to the main forming surface of the main sectors and to the intermediate forming surface of the intermediate sectors.

\* \* \* \* \*